United States Patent
Sangameswaran et al.

(10) Patent No.: US 9,834,194 B2
(45) Date of Patent: Dec. 5, 2017

(54) METHOD AND SYSTEM FOR ENABLING ELECTRICAL LOADS DURING AN ENGINE AUTO START

(75) Inventors: Sangeetha Sangameswaran, Canton, MI (US); Kirk Pebley, Novi, MI (US); Kevin Roy Harpenau, Peachtree City, GA (US); Eric Michael Rademacher, Royal Oak, MI (US); David Celinske, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1077 days.

(21) Appl. No.: 13/204,748

(22) Filed: Aug. 8, 2011

(65) Prior Publication Data

US 2013/0041556 A1 Feb. 14, 2013

(51) Int. Cl.
| | |
|---|---|
| *B60W 20/00* | (2016.01) |
| *B60W 10/30* | (2006.01) |
| *B60K 6/485* | (2007.10) |
| *B60W 10/06* | (2006.01) |
| *F02N 11/08* | (2006.01) |

(52) U.S. Cl.
CPC ............. *B60W 20/00* (2013.01); *B60K 6/485* (2013.01); *B60W 10/06* (2013.01); *B60W 10/30* (2013.01); *F02N 11/0814* (2013.01); *F02N 2200/0809* (2013.01); *Y02T 10/6226* (2013.01)

(58) Field of Classification Search
USPC ...................................................... 701/1, 36
See application file for complete search history.

(56) References Cited

U.S. PATENT DOCUMENTS

| | | | |
|---|---|---|---|
| 6,885,920 B2 | 4/2005 | Yakes et al. | |
| 7,745,953 B2 | 6/2010 | Puccetti et al. | |
| 2007/0075584 A1* | 4/2007 | Moriya et al. | ................. 307/9.1 |
| 2007/0124037 A1* | 5/2007 | Moran | ............................ 701/22 |
| 2009/0026838 A1 | 1/2009 | Abe | |
| 2013/0158842 A1* | 6/2013 | Moriya | ................... F02D 29/02 701/112 |

FOREIGN PATENT DOCUMENTS

| | | | | |
|---|---|---|---|---|
| EP | 2138712 A1 | 12/2009 | | |
| WO | WO 9950097 A1 * | 10/1999 | ............. | B60R 16/02 |

* cited by examiner

*Primary Examiner* — Kimberly Berona
*Assistant Examiner* — Jordan S Fei
(74) *Attorney, Agent, or Firm* — David B. Kelley; Brooks Kushman P.C.

(57) ABSTRACT

An automotive vehicle includes an engine, a plurality of electrical load subsystems, and at least one controller. During an auto start of the engine, the at least one controller detects a starter disengage condition. In response to detecting the starter disengage condition, the at least one controller periodically determines a value of an operating parameter associated with the vehicle, causes a first subset of the electrical load subsystems to be enabled when the value of the operating parameter falls with a first predefined range of values, and causes a second subset of the electrical load subsystems to be enabled when the value of the operating parameter falls within a second predefined range of values.

6 Claims, 2 Drawing Sheets

METHOD AND SYSTEM FOR ENABLING ELECTRICAL LOADS DURING AN ENGINE AUTO START

TECHNICAL FIELD

This disclosure relates to algorithms and systems implementing the same for enabling or "turning on" electrical subsystems during an engine auto start.

BACKGROUND

A micro-hybrid vehicle may automatically stop its internal combustion engine for a period of time during intervals of a drive cycle when vehicle speed approaches or is equal to zero. These engine auto stops may improve fuel economy by reducing engine idle time (and thus fuel consumption) for the drive cycle.

SUMMARY

A method for controlling a plurality of vehicle electrical load subsystems may include, during an auto start of an engine, enabling a first subset of the subsystems when a value of a vehicle operating parameter falls with a first predefined range of values, and enabling a second subset of the subsystems when the value of the parameter falls within a second predefined range of values.

An automotive vehicle may include an engine, a plurality of electrical load subsystems, and at least one controller configured to cause, during an auto start of the engine, the subsystems to be sequentially enabled according to a priority associated with each of the subsystems and a value of at least one operating parameter associated with the vehicle.

An automotive vehicle may include an engine, a plurality of electrical load subsystems, and at least one controller. The at least one controller may be configured to detect, during an auto start of the engine, a starter disengage condition, and in response to detecting the starter disengage condition, periodically determine a value of an operating parameter associated with the vehicle, cause a first subset of the electrical load subsystems to be enabled when the value of the operating parameter falls with a first predefined range of values, and cause a second subset of the electrical load subsystems to be enabled when the value of the operating parameter falls within a second predefined range of values.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
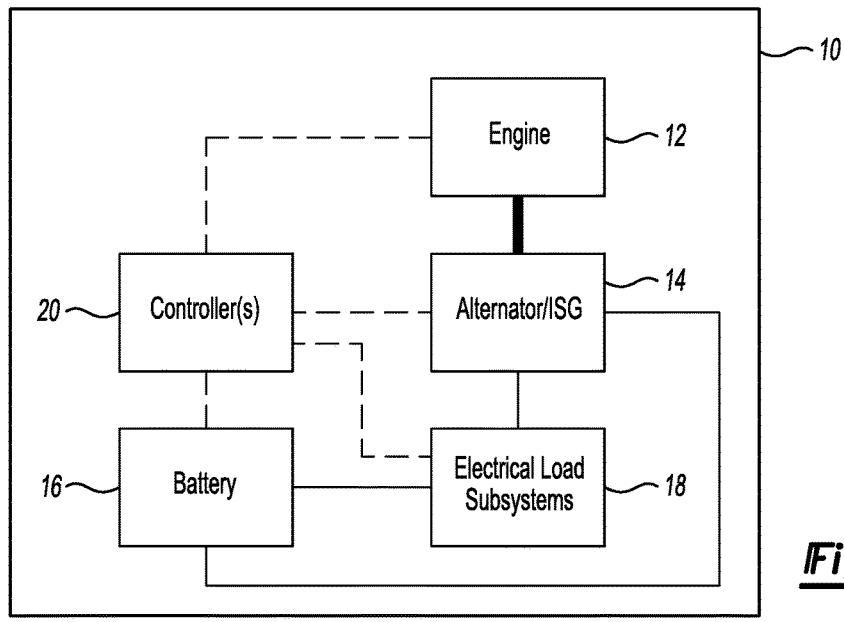
FIG. 1 is a block diagram of a micro-hybrid vehicle.

Referring to FIG. 1, a micro hybrid vehicle 10 may include an engine 12, an alternator or integrated starter generator 14, a battery 16 (e.g., a 12 V battery), electrical load subsystems 18 (e.g., electric power steering assist system, electric park brake system, HVAC blower system, heated windshield system, etc.) in communication with/under the control of one or more controllers 20 (as indicated by dashed line). The engine 12 is mechanically connected with the alternator or integrated starter generator 14 (as indicated by heavy line) such that the engine 12 may drive the alternator or integrated starter generator 14 to generate electric current. The alternator or integrated starter generator 14 and battery 16 are electrically connected with each other and the electrical load subsystems 18 (as indicated by thin line). Hence, the alternator or integrated starter generator 14 may charge the battery 16; the electrical load subsystems 18 may consume electric current provided by the alternator or integrated starter generator 14 and/or battery 16.

The controllers 20 may initiate an auto stop or auto start of the engine 12. As the vehicle 10 comes to a stop, for example, the controllers 20 may issue a command to begin the process to stop the engine 12, thus preventing the alternator or integrated starter generator 14 from providing electric current to the electrical load subsystems 18. The battery 16 may provide electric current to the electrical load subsystems 18 while the engine 12 is stopped. As a brake pedal (not shown) is disengaged (and/or an accelerator pedal (not shown) is engaged) after an engine auto stop, the controllers 20 may issue a command to begin the process to start the engine 12, thus enabling the alternator or integrated starter generator 14 to provide electric current to the electrical load subsystems 18.

Figure 2:
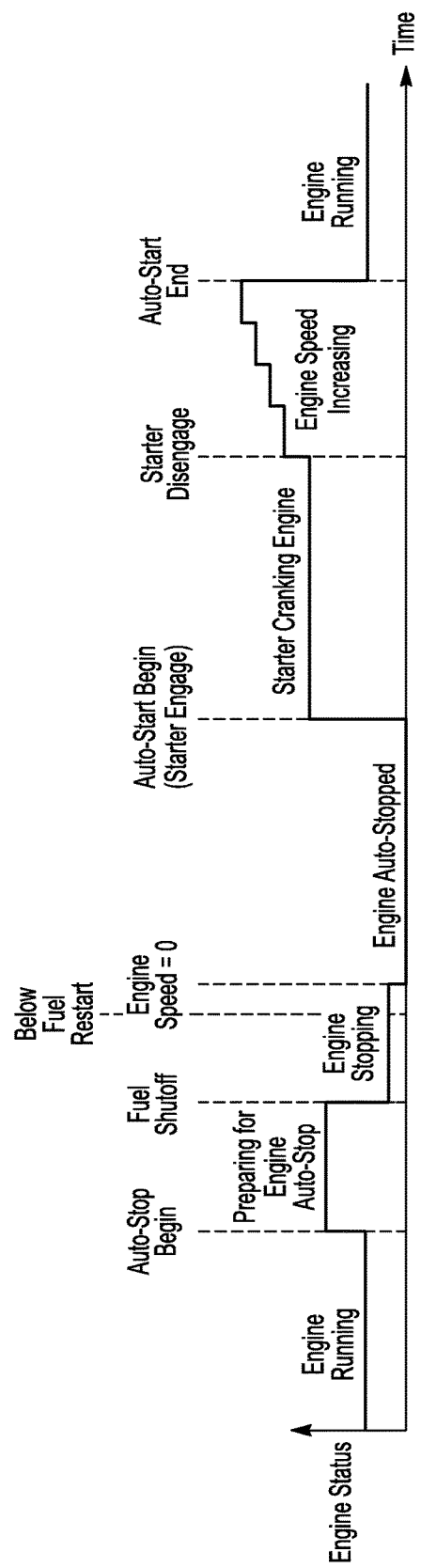
FIG. 2 is a plot of engine status versus time before, during and after an engine stop/start event.

Referring to FIG. 2, an engine auto stop event may include several stages. "Auto-stop begin" marks the beginning of the engine auto stop event. "Preparing for engine auto-stop" is the time period during which vehicle systems as well as the engine are prepared for the impending engine stop. If an auto stop inhibit condition is detected during this stage, the preparation for the impending engine stop is discontinued and the vehicle systems and engine are returned to their normal operating modes. "Fuel shutoff" marks the point at which fuel flow to the engine is stopped. "Engine stopping" is the time period during which the engine speed reduces to 0. "Below fuel restart" marks the point after which if a restart is requested during the "engine stopping" stage, the starter may need to be engaged to crank the engine. If a restart is requested before "below fuel restart" and during the "engine stopping" stage, the engine may be restarted by turning the flow of fuel back on. "Engine speed=0" marks the point at which the engine speed is near or equal to 0.

"Engine auto-stopped" is the time period during which the engine is off. "Starter engage" marks the point at which the starter starts to crank the engine in an effort to start the engine in response to detecting an engine auto start condition. "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). "Auto-start end" marks the point at which the speed of the engine achieves its running speed.

Certain of the electrical load subsystems 18 may have their functionality restricted or be "turned off" during the "engine auto-stopped" stage. As an example, an electric power steering assist system may be disabled as such assist may be unnecessary while the vehicle 10 is stopped. An electric park brake system may be disabled for similar reasons. As another example, an HVAC blower system and/or heated windshield system may be disabled to reduce the amount of electric current required during an auto stop of the engine 12. Other scenarios are also possible.

Electrical load subsystems that have their functionality restricted or disabled during the "engine auto-stopped" stage may have their functionality restored or "turned on" during the "engine speed increasing" stage for at least two reasons: movement of the vehicle 10 may be imminent so electrical load subsystems such as the electric power steering assist system and electric park brake system may be needed; the alternator or integrated starter generator 14 is able to supply at least some electric current during this stage so there may no longer be a need to limit the amount of electric current demanded as before. Restoring functionality or "turning on" restricted or disabled loads at the same time while the speed of the engine 12 is increasing, however, may cause large drops in system voltage: the alternator or integrated starter generator 14 may not be able to handle sudden increases in electric current demand before being fully operational. Hence, strategies and systems implementing the same are described for preventing restricted or disabled loads from being restored or "turned on" at the same time while engine speed increases following an auto start.

The electrical load subsystems 18 may be classified or categorized, in certain examples, according to priority. That is, certain of the electrical load subsystems 18 may be more necessary than others. For example, an electric power steering assist system may be more important to a driver as compared with a heated windshield system. The electric park brake system may be more important to a driver compared with an HVAC blower system, etc. Hence, the aforementioned loads may be classified into four categories (or any number of desired categories): category 1—electric power steering assist system; category 2—electric park brake system; category 3—HVAC blower system; and, category 4—heated windshield system. As described in more detail below, restricted or disabled loads may be restored or "turned on" sequentially according to their categorization. Any suitable ranking system for any number of electrical load subsystems, however, may be used. As an example, electrical loads may be ranked according to the amount of current they require. Loads requiring relatively less current may be ranked higher than loads requiring relatively more current, etc. Additionally, certain loads that are designed such that they cannot be controlled electronically may also be considered when determining the ranking or prioritization.

In certain examples, a particular category of the electrical load subsystems 18 may be restored or "turned on" if the speed of the engine 12 falls within a particular range. Continuing with the example above, four speed ranges may be defined: range 1-W to X (RPM); range 2-X to Y (RPM), range 3-Y to Z (RPM); and, range 4-Z to a speed greater than target idle speed (RPM), where W<X<Y<target idle speed, and where Y<Z. W, X, Y and Z may be determined via testing, simulation, etc. such that, for example, system performance is balanced with customer expectations. The controllers 20 may monitor the speed of the engine 12 and restore or "turn on" category 1 subsystems when the engine speed falls within range 1. The controllers 20 may restore or "turn on" category 2 subsystems when the engine speed falls within range 2, etc. Alternatively, the controllers 20 may broadcast the speed range of the engine 12. The electrical load subsystems 18 may monitor such information broadcast by the controllers 20 and enable themselves when appropriate in response.

Engine speed is used in the above example because it is assumed that the output of the alternator or integrated starter generator 14 is a function of engine speed (as the engine 12 mechanically drives the alternator or integrated starter generator 14). Hence, the greater the engine speed, the greater the capability of the alternator or integrated starter generator to generate output. In other examples, output (voltage, current, etc.) of the alternator or integrated starter generator 14 may be monitored and used to determine when to restore or "turn on" certain electrical loads. The greater the output, the greater the number of electrical loads that may be enabled. Other parameters may also be used. A particular category of electrical load subsystems may be restored or "turned on" if a certain amount of time has passed since "starter disengage." Category 1 subsystems may be restored or "turned on" immediately following "starter disengage." Category 2 subsystems may be restored or "turned on" if at least Q seconds have passed since "starter disengage," etc. Combinations of parameters may also be used. As an example, alternator or integrated starter generator output and time may be used such that a particular category of electrical load subsystems is not enabled until there is sufficient output and at least a certain amount of time has passed since "starter disengage." Other scenarios are also contemplated.

Vehicle passengers may attempt to enable certain of the electrical load subsystems 18 during a stop/start event. For example, a driver may attempt to "turn on" a radio subsystem or a climate subsystem while the engine 12 is auto stopped. Depending on when such attempts are made, they may conflict with the strategies described herein for sequentially enabling the various electrical loads. That is, a driver may happen to try to "turn on" a climate subsystem immediately after "starter disengage." If, however, the climate subsystem is not categorized to be enabled immediately after "starter disengage," the driver's request may not be honored until the category that the climate subsystem falls within is cleared to be enabled. Assuming in this example, that the climate system is not scheduled to be enabled until the alternator or integrated starter generator output achieves some predetermined threshold, the driver's request may not be honored until the alternator or integrated starter generator output achieves the predetermined threshold.

Figure 3:
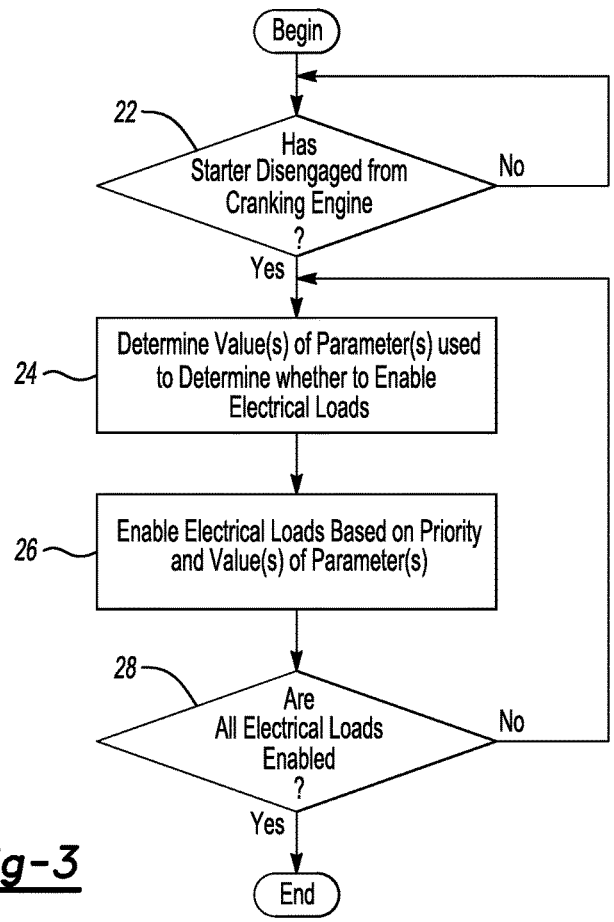
FIG. 3 is a flow chart of an algorithm for determining when to enable electrical loads during an engine auto start.

Referring to FIG. 3, it is determined whether the starter has disengaged from cranking the engine at operation 22. For example, the controllers 20 may monitor a controller area network for information (e.g., a status flag, etc.) indicating that the "starter disengage" stage has ended. If no, the algorithm returns to operation 22. If yes, value(s) of the parameter(s) used to determine whether to enable the electrical load subsystems are determined at operation 24. The controllers 20, for example, may read information regarding engine speed, system current, and/or time passed since the end of "starter disengage," etc. At operation 26, electrical load subsystems are restored or "turned on" based on the priority of the particular electrical load subsystem under consideration and the values determined at operation 24. For example, the controllers 20 may read information about alternator or integrated starter generator output, categorize the information, and broadcast a category associated with the information. If the output is between $\alpha$ and $\beta$ (V), then the controllers 20 may broadcast a category 1 indicator. The electrical load subsystems 18 may monitor communication lines with the controllers 20 and operate to enable themselves if they are classified as a category 1 subsystem. If the output is between β and γ (V), then the controllers 20 may broadcast a category 2 indicator, and so forth. Alternatively, the controllers 20 may be arranged so as to control the enabling of the electrical load subsystems 18. The controllers 20, in these circumstances, need not broadcast category information. Rather, the controllers 20 may read information about output, categorize the information, and enable the electrical load subsystems 18 directly based on the categorization and the priority associated with the electrical load subsystems 18. Other scenarios are also contemplated. At operation 28, it is determined whether all of the electrical load subsystems are enabled. The controllers 20, for example, may request status information from each of the electrical load subsystems 18. The controllers 20 may alternatively detect status of each of the electrical load subsystems 18. If no, the algorithm returns to operation 24. If yes, the algorithm ends.

The algorithms disclosed herein may be deliverable to/implemented by a processing device, such as the controllers 20, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method comprising:
    after occurrence of a starter disengage condition during an engine autostart and before completion of the autostart,
        supplying power from an alternator to a first set of vehicle electrical subsystems responsive to engine speed achieving a first threshold, and
        supplying power from the alternator to a second set of vehicle electrical subsystems responsive to the engine speed achieving a second threshold greater than the first threshold.

2. The method of claim 1, wherein the first set of vehicle electrical subsystems includes an electric power steering assist system, an electric park brake system, an HVAC blower system, or a heated windshield system.

3. The method of claim 1, wherein the second set of vehicle electrical subsystems includes an electric power steering assist system, an electric park brake system, an HVAC blower system, or a heated windshield system.

4. A method comprising:
    after occurrence of a starter disengage condition during an engine autostart and before completion of the autostart,
        supplying power from an integrated starter generator (ISG) to a first set of vehicle electrical subsystems responsive to engine speed achieving a first threshold, and
        supplying power from the ISG to a second set of vehicle electrical subsystems responsive to the engine speed achieving a second threshold greater than the first threshold.

5. The method of claim 4, wherein the first set of vehicle electrical subsystems includes an electric power steering assist system, an electric park brake system, an HVAC blower system, or a heated windshield system.

6. The method of claim 4, wherein the second set of vehicle electrical subsystems includes an electric power steering assist system, an electric park brake system, an HVAC blower system, or a heated windshield system.

* * * * *